United States Patent [19]

Bieganski

[11] Patent Number: 4,979,299

[45] Date of Patent: Dec. 25, 1990

[54] COAXIAL CABLE STRIPPER

[76] Inventor: Zdzislaw Bieganski, Brushwood, Kinsbourne Green, Harpenden, Herfordshire, England

[21] Appl. No.: 516,565

[22] Filed: Apr. 30, 1990

[30] Foreign Application Priority Data

May 10, 1989 [GB] United Kingdom ............... 8910787

[51] Int. Cl.⁵ .................... B21F 13/00; H02G 1/12; B21E 21/00
[52] U.S. Cl. ..................... 30/90.1; 30/91.2; 30/90.6
[58] Field of Search ............ 30/90.1, 90.2, 90.6, 30/90.8, 91.1, 91.2; 81/9.4, 9.41, 9.42

[56] References Cited

U.S. PATENT DOCUMENTS

| | | | |
|---|---|---|---|
| 2,120,398 | 6/1938 | Edwards et al. | 30/90.2 |
| 2,477,678 | 8/1949 | Woolman | 30/90.8 |
| 2,903,064 | 9/1959 | Blonder | 30/90.6 |
| 4,117,749 | 10/1978 | Economu | 30/90.6 |

Primary Examiner—Douglas D. Watts
Assistant Examiner—Paul M. Heyrana, Sr.
Attorney, Agent, or Firm—Learman & McCulloch

[57] ABSTRACT

A coaxial cable stripper (FIG. 1) has a tubular body 10 locating a cable guide 40. One part of the body 26 is hinged at 24 and carries cutters 34 36 38 which project through a window in the body so that as the part 26 is moved angularly the cutters can bite into the cable supported at 48 on the cable guide and to different depths according to the relative projection of the blades. The axial spacing of the cutters is dictated by pacing pieces between the blades. The angular position is controlled by a ratchet 20. The tool is turned about the cable to make encircling cuts and then pulled axially of the cable to strip off the sheathing.

7 Claims, 2 Drawing Sheets

COAXIAL CABLE STRIPPER

This invention relates to tools for stripping the sheathing from the successive layers of a coaxial cable for the purposes of attachment of terminals. EP 0 018 158 proposes a tool for this purpose having a body, a blade carrier movable relative to the body, and three separate chisel-like blades each associated with a separate aperture in the body. The carrier is spring urged in a direction to take the blades across the apertures, and individual adjusters enable the extent of spring driven overlap of blades and apertures to be varied. Each blade is connected to its adjuster by a headed pin and a T slot. The tool is used by retracting the carrier against the springs, inserting a cable into a first aperture until a point on the outer sheath where the sheath is to be cut is positioned opposite the first blade. Then the springs drive that blade to cut into the sheath. The tool and cable are relatively rotated to make an encircling cut. The cable is pulled out using the blade as an abutment stop to hold the severed sleeve of cable thus stripping off the end portion of that outer sheath. The cable is then inserted at a different axial point in the second aperture and the operation repeated to leave a bared portion of the screen, and then for a third time at yet another point to strip off the inner insulation leaving the bared core.

The operation with the tool of the said EP thus involves the three blades being set to appropriate projections, corresponding to the required cable parameters, and the cable being positioned relative to the tool at axially appropriate points suitable to the particular terminal. There are very many different sizes of cable in existence and very many different terminals. The tool is versatile and can be accommodated to suit many or even all of the variables, but setting up time, which usually means making empiric adjustments, can be long and wasteful of cable, and because there is no satisfactory control of the actual spacing of the cuts, a high degree of user skill is necessary in order to provide completely satisfactory results.

The object of the invention is to provide an improved tool which can be "dedicated" that is to say made suitable for a particular combination of cable and terminal so as to give easily repeatable results with only a low degree of user skill: and which can be converted to a different cable and/or terminal in a simple manner.

According to the invention a cable stripper comprises a tubular body, a cable guide in the body, a window opening laterally of the body, a part hinged on axis parallel to that of the body, a series of pointed cutters located in parallel planes normal to said axis, spaced apart at predetermined distances by packing pieces, and projecting towards the body axis for different distances, and abutment means limiting hinged travel of the said part in a direction which takes the cutters through the said window and towards the body axis.

Preferably the part carrying the cutter blades is spring urged relative to the body. Preferably also, means are provided for controlling the relative positions comprising a pawl and ratchet. The spring means may urge the parts together or apart.

The cutter blades may be interchanged to give different spacing and different projections to suit different cables and terminals and the cable guide itself may be interchangeable in the first body part to suit different cable diameters.

Embodiments of the invention are now more particularly described by way of example and with reference to the accompanying drawing wherein.

Figure 1:
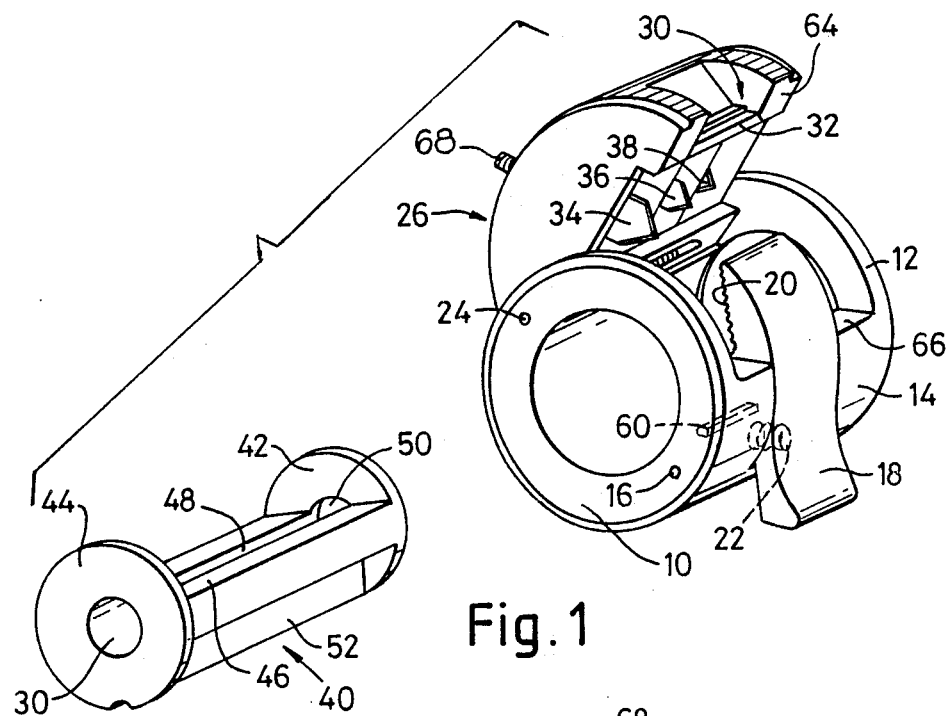
FIG. 1 is an exploded perspective view of a first tool showing the tool in an open position.

Referring to the drawings, the first body part comprises a pair of circular and co-axial end cheeks 10, 12 joined by a generally semi-annular portion 14. The cheeks mount a pivot pin 16 for a lever 18 integral with ratchet 20 and which is spring urged in an anti-clockwise direction as viewed in the drawings by compression spring 22.

Approximately diametrically of the pin 16 in relation to the end flanges is a second and parallel hinge pin 24 which mounts the second body part 26. The latter is generally semi-circular and is received between the end flanges 10, 12.

The part 26 is cut away at 30 between its end to provide a pawl 32, and part 26 sits in the window in the body.

Figure 2:
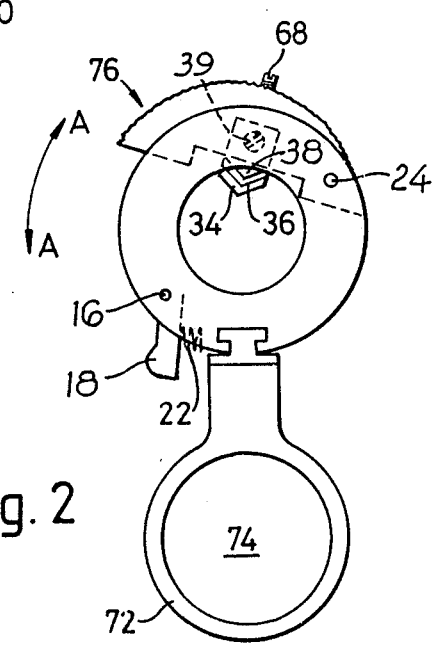
FIG. 2 is an end elevation of the same in a part closed position.
Figure 5:
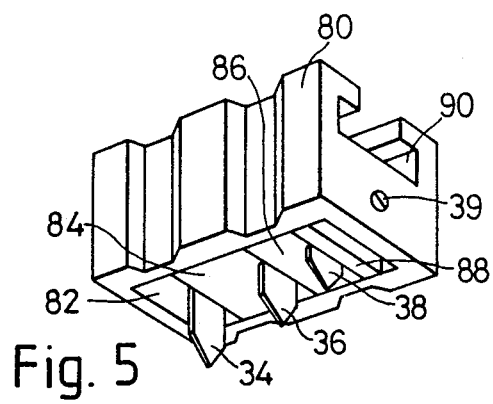
FIG. 5 is a perspective view of a component which may be used in any of the embodiments.

An internal surface of the part 26 is provided with a series of pointed, that is Vee shaped cutter blades 34, 36, 38 which are generally parallel to one another, and project for a different distance towards the axis, as best seen in FIG. 2. These blades are assembled with spacers therebetween and fixed in position by an end screw 39. The blades and spacers may form a subassembly, for example held together in a box FIG. 5, 6, or by making the spacers with relieved faces so that the blades are clamped therebetween, to enable an additional adjustment to be provided as explained later in this specification.

The use of Vee shaped cutter blades is important and gives several advantages, namely it increases the load per unit area applied relative to the force used to displace the cutters, and hence allows minimum force to be used. By selecting the included angle of the Vee the cutting angle can be controlled. This is especially important with squashy insulation layers where the conventional chisel ended cutters encounter difficulties. Because only one of the edges of each Vee is used at any one time, the two edges can be used alternately by rotating the tool about the cable being treated in either direction, clockwise or anticlockwise to give double life of the cutters.

The cable guide 40 comprises a pair of end flanges 42, 44, one of which is received in the end flange 12 and the other of which is to seat on the end flange 10, when the guide is assembled to the body. FIG. 1 shows the guide pulled out of the body, for clarity.

The two end flanges are joined by a cable support member 46 which has a semi-circular groove 48 extending along its length and opening to the bores 15 in the end flanges. The support member 46 includes a rib 52 extending between the end flanges and the rib may have a keyway in its underface to engage a key 60 provided in the bore in the body, for the purpose of aligning the cable guide angularly as required so that a cable extending through the bores 50 and supported on the cable support member 46 is exposed for operation by the cutting blade when the tool is used, as explained later in this specification.

Figure 6:
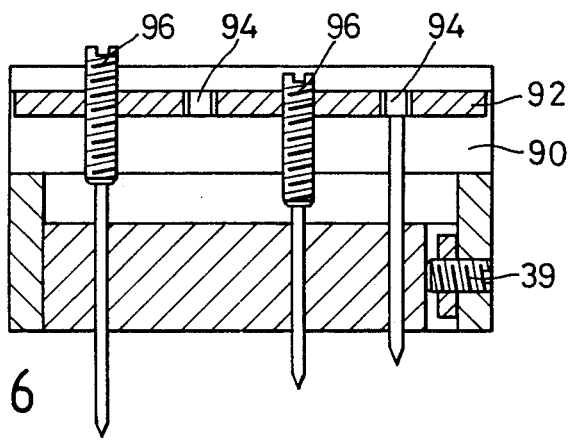
FIG. 6 is a sectional elevation of the component of FIG. 5.

A series of different cable guides may be provided having different diameter bores 50 and grooves, and one appropriate to the diameter of the cable to be treated will be inserted into the tool. The cable is then inserted into that bore to an appropriate axial position, which may be with its end flush with the end of the cable guide. If desired, axially adjustable end stops may be provided to enable variation in this respect. When the cable is in position, the part 26 is pivoted from the FIG. 1 position to and beyond the FIG. 2 position whereupon the pawl and ratchet engage. The closing movement of the part 26 will be limited by the resistance provided by the cable as the cutter blades pierce the various layers of the cable insulation and screen. The tool is then turned around the cable, that is in the direction of the arrows A—A in FIG. 2. This causes a series of shallow cuts to be made in the cable outer layers. As these cuts deepen the part 26 is closed further into the cable guide with the ratchet holding the part in the progressively adjusted position, and further turning of the tool about the cable enable the peripheral cuts to be deepened. Further adjustment becomes impossible when the end surfaces 64 on the part 26 seat on the body surfaces 66. When this occurs (often within less than one revolution), and possibly after the tool has been rotated once more to ensure completion of the cuts, it will be possible to strip the cable by pulling it out of the tool. Satisfactory stripping at this point will depend upon the projection of the blades being appropriate for the cable being treated. This depends upon appropriate selection and adjustment of the blades. Small adjustments can be made to perfect the setting of the tool by the use of an adjustment screw 68 engaged in the part 26 and abutting against the block comprising the blades and their spaces, as mentioned earlier in this specification. In the arrangement of FIGS. 1 and 2 the screw is accessible from the exterior and acts on the block of blades as a whole. However, in the preferred arrangement in this respect shown in FIGS. 4 to 6 the box 80 receives the assembly of packing spacers 82–88 and the blades 34–38, and that assembly is clamped in the box by the end screw 39. The box 80 has a Tee slot 90 receiving an adjuster plate 92 which is provided with a row of screwthreaded holes 94. Any number of these may be provided, preferably at regular spacings along the length of the plate, so that selected ones of them which are opposite selected ones of the blades may receive adjuster screws 96. This enables a single standardized blade pattern to be employed, with one such blade seating on the plate and the other two blades being adjusted to different projections by screws in appropriate holes and which are turned to appropriate positions. However, all three blades could be screw-adjusted if required.

It is preferred to make the tool of the present invention as a dedicated tool suitable for a particular cable size, in which case it may be unnecessary to make the cable guide 40 as a separate and thus interchangeable part. In such circumstances the end flanges 10, 12 may have a relatively small hole therethrough, corresponding to the cable diameter in question, and the interior of the body be provided with a groove or like to support the cable during the cutting operation.

However, it is preferred to make the cable guide as a separate part for convenience in manufacture so that a range of different co-axial cable strippers may be provided from standardised body components, and assembled with different blade adjustment and packing pieces, as well as different cable guides in manufacture of the tool according to the cable and also its terminal which is intended to be used with the tool.

Figure 4:
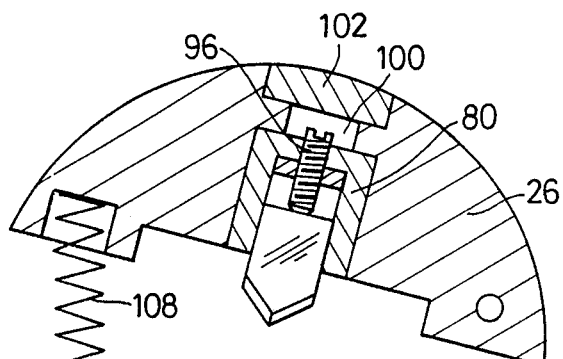
FIG. 4 is a fragmentary enlarged view showing a third embodiment.

FIG. 4 shows the cutter box received in a chamber in the second body part, with an aperture 100 in the base of the chamber allowing access to the adjuster screws 96, the aperture being blocked off in normal use by closure plug 102. In assembly and adjustment for example during manufacture the screws are accessible and then the closure plug is inserted. The adjustment means is then concealed from view against tampering in ordinary use.

FIG. 2 shows a finger ring 72 fixed to the body at one side and which is convenient for turning the tool about the cable axis, and in that event the finger may be inserted through the aperture 74 whilst a thumb of the same hand is used generally in the position of the reference numeral 76 to apply pressure to close the part 26 with accompanying ratchet action whilst the operation proceeds. However, the ring 72 may be omitted or replaced by a handle or other operating means as required. The FIG. 2 arrangement has no spring loading on the body parts, and is operated entirely by manual pressure to move part 26 against the resistance of the cable and with the ratchet and pawl holding the parts in the (from time to time) adjusted position.

Figure 3:
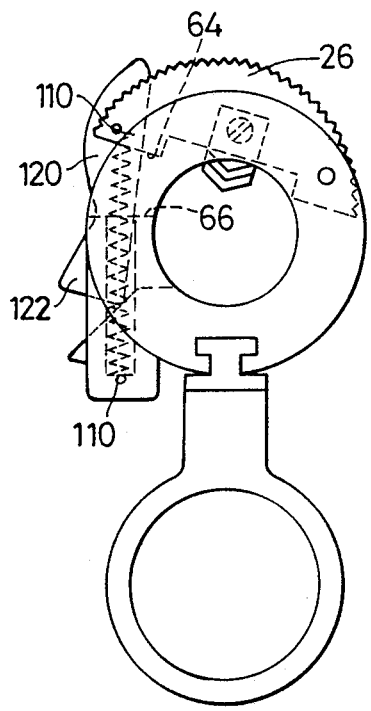
FIG. 3 is a view similar to FIG. 2 but of a second embodiment.

In the FIG. 3 arrangement a tension spring 106 is provided fixed to the parts by pins 110 and this urges the parts together towards the position in which the blades penetrate the cable. In order to hold the tool open to receive a cable, that is with the cutters withdrawn from the effective position, lever 120 is pivoted to the part 26 and the heel 122 of the lever can lodge on the face 66 to hold the tool open. Pivoting the lever clockwise in FIG. 3 releases the engagement and allows the springs to operate to pull the cutters into effective position, the pivotal movement of the part 26 terminating when the faces 64, 66 abut as before.

In the FIG. 4 version, compression springs 108 are provided which urge the body parts to the open position and those springs are overcome by manual pressure applied when a stripping operation is to be performed.

Having now described my invention what I claim is:

1. A cable stripper comprising a tubular body, a cable guide in the body, a window opening laterally of the body, a part hinged on an axis parallel to that of the body, a series of pointed cutters located in parallel planes normal to said axes, spaced apart at predetermined distances by separable and removable packing pieces, and projecting towards the body axis for different distances, and abutment means limiting hinged travel of the said part in a direction which takes the cutters through the said window and towards the body axis.

2. A stripper as claimed in claim 1 wherein the cable guide is detachable and provided with a support surface for a cable to be stripped, and means are provided for aligning the cable guide angularly in the body so that said support surface is disposed opposite to said window.

3. A stripper as claimed in claim 1 wherein the abutment means comprise a ratchet and pawl for controlling the hinged position.

4. A stripper as claimed in claim 3 wherein one or more compression springs are provided between the body and hinged part to resist movement of the hinged part towards the body axis.

5. A stripper as claimed in claim 1 wherein one or more springs are interposed between the body and hinged part serving to urge the latter towards the body axis.

6. A stripper as claimed in claim 1 wherein the cutters are located in a box with a plate interposed between the base of the box and the ends of the cutters, and screw threaded means are provided for adjusting the positions of at least two cutters relative to a third cutter in said box.

7. A stripper as claimed in claim 6 wherein the said cutter box is located in a chamber in said hinged body part, and a closure plug is located in said chamber radially outwardly of said box relative to the body axis and the cutters project radially inwardly from said box towards the body axis.

* * * * *